T. J. TUTHILL.
Rotary Cultivator.
No 6,091.                      Patented Feb. 6, 1849.
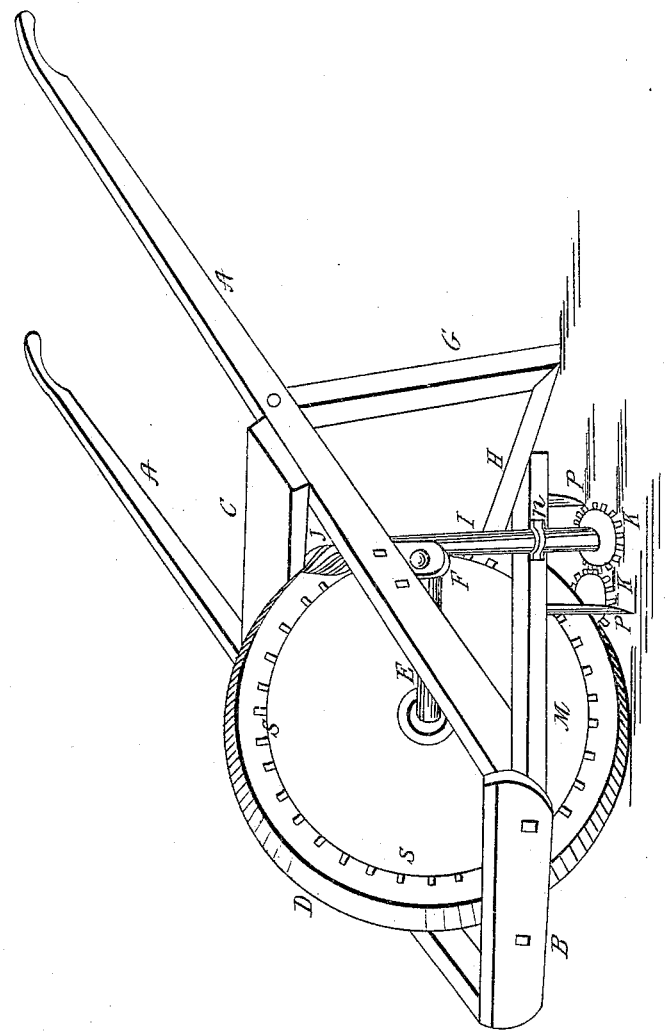

UNITED STATES PATENT OFFICE.

THO. J. TUTHILL, OF ELMIRA, NEW YORK.

IMPROVEMENT IN ROTARY-CUTTER PLOWS.

Specification forming part of Letters Patent No. 6,091, dated February 6, 1849.

*To all whom it may concern:*

Be it known that I, THOMAS J. TUTHILL, of Elmira, in the county of Chemung and State of New York, have invented a new and useful Improvement in Cultivators; and I hereby declare that the following is a full and exact description of the construction and operation of the same, reference being had to the annexed drawing, making part of this specification.

The principal frame-work of this utensil consists of two inclined handle-shafts, A, connected by a head-piece, B, in front, and by a cross-board, C, near the center. Within the quadrangle thus formed is placed a single wheel, D, two feet or more in diameter and three or four inches thick, and furnished with a circular series of projecting teeth, S S, on each side, two or three inches from the periphery. This wheel is attached to the middle of a horizontal axle, E, the pivots of which have their bearings in boxes F, attached to the under sides of the handle-shafts, so that the machine rests principally upon the wheel. The rear or upper ends of the handle-shafts are formed like plow-handles, and are two feet apart, the head-piece being the same distance in length.

Near the cross-board C a standard or leg, G, is attached to each handle-shaft, and extends downward nearly to the ground, and the bottoms of these are connected by a cross-bar, H. Two parallel horizontal rails, M, extend from the head-piece to the cross-bar H, being attached to each. To the outside of each rail is attached a bearing-box, $n$, through which passes a vertical screw-shaft, I, the upper bearing of this shaft being in the cross-board C. This shaft is furnished with a series of spiral grooves or screw-threads, J, which come in contact with the teeth of the wheel, so that when the wheel revolves the teeth pass through the spiral grooves, and thus produce rotary motion in the screw-shaft.

To the bottom of each screw-shaft is attached a horizontal rotary cutter, K, the edges of which are sharp and toothed for the purpose of cutting the roots of weeds and pulverizing the earth in their progress.

The rails and cross-bar are each furnished with one or more harrow-teeth or furrowers, P P. This machine is to be drawn by horses, while the attendant manages it by the handles, so as to carry the rotary cutters at the required depth below the surface of the earth. The rotary motion in the screw-shafts may be reversed alternately by their being changed to opposite sides, and will thereby turn inward or outward, as required.

What I claim as my invention, and desire to secure by Letters Patent, is—

The rotary cutters K K and screw-shafts I J, in combination with the wheel and handle-shafts, arranged in the manner and for the purpose herein described.

THOMAS J. TUTHILL.

Witnesses:
   J. S. SHOCKY,
   THO. S. SPALDING.